United States Patent
Wagner, II

(10) Patent No.: US 12,397,282 B2
(45) Date of Patent: Aug. 26, 2025

(54) TRAPPING AND SEQUESTERING OF CONTAMINANTS WITH PREHYDRATED MICROPARTICLES

(71) Applicant: Echo Scientific LLC, Pittsburgh, PA (US)

(72) Inventor: Donald J. Wagner, II, Pittsburgh, PA (US)

(73) Assignee: Echo Scientific LLC, Pittsburgh, PA (US)

( * ) Notice: Subject to any disclaimer, the term of this patent is extended or adjusted under 35 U.S.C. 154(b) by 26 days.

(21) Appl. No.: 17/459,969

(22) Filed: Aug. 27, 2021

(65) Prior Publication Data

US 2022/0062859 A1   Mar. 3, 2022

Related U.S. Application Data

(60) Provisional application No. 63/108,658, filed on Nov. 2, 2020, provisional application No. 63/071,675, filed on Aug. 28, 2020.

(51) Int. Cl.
  *B01J 20/30*  (2006.01)
  *B01J 20/28*  (2006.01)
  (Continued)

(52) U.S. Cl.
  CPC ... *B01J 20/28004* (2013.01); *B01J 20/28028* (2013.01); *B01J 20/28083* (2013.01);
  (Continued)

(58) Field of Classification Search
  CPC ......... C25B 15/085; C25B 15/08; C02F 1/28; C02F 2303/04; B01J 20/28004;
  (Continued)

(56) References Cited

U.S. PATENT DOCUMENTS

| | | | |
|---|---|---|---|
| 5,369,011 A | 11/1994 | Ebersole et al. | |
| 5,432,077 A | 7/1995 | Farrah | |

(Continued)

FOREIGN PATENT DOCUMENTS

| | | | |
|---|---|---|---|
| CN | 1615700 A | | 5/2005 |
| CN | 103387277 A | * | 11/2013 |

(Continued)

OTHER PUBLICATIONS

Huang, Ren-Shu & Hou, Bao-Fei & Li, Hai-Tao & Fu, Xu-Cheng & Xie, Cheng-Gen. (2015). Preparation of silver nanoparticles supported mesoporous silica microspheres with perpendicularly aligned mesopore channels and their antibacterial activities. RSC Adv.. 5. 61184-61190. 10.1039/C5RA06358B. (7 pages). (Year: 2015).*

(Continued)

*Primary Examiner* — Patrick Orme
(74) *Attorney, Agent, or Firm* — The Webb Law Firm

(57) ABSTRACT

A method of trapping and removing contaminants from a source of contamination using a microparticle media includes the steps of: providing the microparticle media, wherein the microparticle media includes a plurality of microparticles, and wherein each of the microparticles includes a substrate having pores; prehydrating the pores of the microparticles by mixing the microparticle media with at least one of a water or water of a electrolysis supernatant solution to form a prehydrated microparticle media having a portion of the water or water of the electrolysis supernatant solution absorbed or adsorbed in the pores of the microparticles; introducing the prehydrated microparticle media to the contaminants, wherein the prehydrated microparticle media trap or bind to the contaminants; and separating the prehydrated microparticle media and the contaminants (Continued)

trapped or bound to the prehydrated microparticle media from the source of contamination.

20 Claims, 4 Drawing Sheets

(51) Int. Cl.
  *C02F 1/28* (2023.01)
  *C25B 15/08* (2006.01)
(52) U.S. Cl.
  CPC ..... *B01J 20/28085* (2013.01); *B01J 20/3085* (2013.01); *C02F 1/28* (2013.01); *C25B 15/085* (2021.01); *C02F 2303/04* (2013.01)
(58) Field of Classification Search
  CPC .............. B01J 20/28028; B01J 20/2803; B01J 20/28078; B01J 20/28085; B01J 20/3085; B01J 20/3078; B01J 20/3007; B01J 20/32; B01J 20/3202
  See application file for complete search history.

(56) References Cited

U.S. PATENT DOCUMENTS

| | | | |
|---|---|---|---|
| 5,900,258 A | 5/1999 | Engler | |
| 6,326,326 B1 * | 12/2001 | Feng ................. | B01J 20/28083 502/64 |
| 6,524,489 B1 | 2/2003 | Palm et al. | |
| 7,175,762 B1 | 2/2007 | Noca et al. | |
| 8,453,849 B2 | 6/2013 | Hamlin et al. | |
| 8,535,654 B2 | 9/2013 | Broughton et al. | |
| 8,546,100 B2 | 10/2013 | Kshirsagar et al. | |
| 9,648,845 B2 | 5/2017 | Fritter et al. | |
| 10,556,221 B2 | 2/2020 | Wang | |
| 10,709,807 B2 | 7/2020 | Kshirsagar | |
| 2006/0018966 A1 | 1/2006 | Lin et al. | |
| 2008/0093310 A1 | 4/2008 | Yeh et al. | |
| 2008/0145455 A1 | 6/2008 | Bedard | |
| 2008/0184939 A1 | 8/2008 | Fritter et al. | |
| 2008/0251027 A1 | 10/2008 | Kirsch et al. | |
| 2008/0305027 A1 | 12/2008 | Johnston et al. | |
| 2009/0134099 A1 | 5/2009 | Yeh et al. | |
| 2009/0311770 A1 | 12/2009 | Hashiguchi et al. | |
| 2010/0190690 A1 | 7/2010 | Spedden | |
| 2011/0020216 A1 | 1/2011 | Mooney et al. | |
| 2011/0024355 A1 | 2/2011 | Mansouri et al. | |
| 2013/0089578 A1 | 4/2013 | Sumulong et al. | |
| 2013/0091611 A1 * | 4/2013 | Ren ..................... | A61P 31/12 424/641 |
| 2013/0134100 A1 | 5/2013 | McGrady et al. | |
| 2014/0341975 A1 | 11/2014 | Livneh | |
| 2015/0208660 A1 | 7/2015 | Mathis et al. | |
| 2016/0332135 A1 | 11/2016 | Taniguchi | |
| 2018/0126356 A1 | 5/2018 | Fleming et al. | |
| 2019/0168145 A1 | 6/2019 | Wang | |
| 2019/0239505 A1 | 8/2019 | Wilson | |

FOREIGN PATENT DOCUMENTS

| | | | | |
|---|---|---|---|---|
| CN | 103783079 A | | 5/2014 | |
| CN | 104891669 A | | 9/2015 | |
| CN | 105035153 A | | 11/2015 | |
| CN | 205736255 U | | 11/2016 | |
| CN | 106432896 A | | 2/2017 | |
| CN | 107619653 A | | 1/2018 | |
| CN | 107723924 A | * | 2/2018 | ............... D01D 5/34 |
| CN | 108341684 A | | 7/2018 | |
| CN | 109265008 A | | 1/2019 | |
| JP | S4935527 A | | 4/1974 | |
| JP | H08259412 A | | 10/1996 | |
| JP | 2000016901 A | | 1/2000 | |
| JP | 2001010902 A | | 1/2001 | |
| JP | 2002146291 A | | 5/2002 | |
| JP | 2002226242 A | | 8/2002 | |
| JP | 2004049361 A | | 2/2004 | |
| JP | 2004329757 A | | 11/2004 | |
| JP | 2006112044 A | | 4/2006 | |
| KR | 200415108 Y1 | * | 4/2006 | |
| KR | 20060109006 A | | 10/2006 | |
| KR | 101639766 B1 | | 7/2016 | |
| KR | 101639767 B1 | | 7/2016 | |
| KR | 101742918 B1 | | 6/2017 | |
| WO | 8404696 A1 | | 12/1984 | |
| WO | 8700199 A1 | | 1/1987 | |
| WO | 9922861 A1 | | 5/1999 | |
| WO | 0114043 A1 | | 3/2001 | |
| WO | WO-2008073507 A2 | * | 6/2008 | ............... A61L 9/16 |
| WO | 2009070581 A1 | | 6/2009 | |
| WO | 2019094962 A2 | | 5/2019 | |

OTHER PUBLICATIONS

Machine translation of CN 103387277 A; Chen et al. (11 pages). (Year: 2013).*
Machine translation of CN-107723924-A; Dai et al. (5 pages). (Year: 2018).*
Machine translation of KR-200415108-Y1; May 27, 2006 (3 pages). (Year: 2006).*
Dye, "Clothing Created to Block Flu, Colds", ABC News, 2007, https://abcnews.go.com/Technology/story?id=3153026&page=1.
Hinestroza, "Can nanotechnology be fashionable?", Materialstoday, 2007, p. 64, vol. 10, No. 9.
Bellotti et al., "Natural Products Applied to Antimicrobial Coatings," Studies in Natural Products Chemistry, 2019, pp. 485-508, vol. 60.
Fernández et al.,"Silica-based bioactive solids obtained from modified diatomaceous earth to be used as antimicrobial filler material," Materials Letters, , 2017, pp. 130-134, vol. 194.
Panacek et al., "Preparation, characterization and antimicrobial efficiency of Ag/PDDA-diatomite nanocomposite," Colloids and surfaces. B, Biointerfaces, 2013, pp. 191-198, vol. 110.
Voiry et al., "Enhanced catalytic activity in strained chemically exfoliated WS2 nanosheets for hydrogen evolution," Nature materials, 2013, pp. 850-855, vol. 12.
Menezes, et al., "Cobalt-Manganese-Based Spinels as Multifunctional Materials that Unify Catalytic Water Oxidation and Oxygen Reduction Reactions", ChemSusChem, 2015, pp. 164-171, vol. 8:1.

* cited by examiner

TRAPPING AND SEQUESTERING OF CONTAMINANTS WITH PREHYDRATED MICROPARTICLES

CROSS REFERENCE TO RELATED APPLICATIONS

This application claims priority to U.S. Provisional Patent Application No. 63/071,675, entitled "Particles for Trapping and Removal of Germs," filed Aug. 28, 2020, and U.S. Provisional Patent Application No. 63/108,658, entitled "Particles for Trapping and Removal of Germs", filed Nov. 2, 2020, and the entire contents of each are herein incorporated by reference.

BACKGROUND OF THE INVENTION

Field of the Invention

The present disclosure relates to trapping and sequestering of contaminants, for example the entrapment and sequestering of microorganisms, viruses, or organic or inorganic matter. More particularly, the disclosure relates to prehydrated microparticles (PMP) that act as a physical trap, sieve, cage, agglomerating agent, for removal and disposal of unwanted contaminants and a method of trapping and removing contaminants using a microparticle media.

Description of Related Art

While microorganisms are symbiotic and essential for life on earth, many of the tens of thousands of microbial species are problematic for mankind in industries such as water treatment, healthcare, the food industry, pulp and paper, the oil & gas, textiles, the leather and plastics industries, paint, coatings and adhesives, and wood.

Microorganisms, including viruses, bacteria, and fungus, cause much morbidity and mortality globally. According to the World Health Organization, "Nearly 50,000 men, women and children are dying every day from infectious diseases; many of these diseases could be prevented . . . ."

The most common method of eliminating unwanted microbes or reducing the number of microbes to a safe level is through the use of chemical antimicrobial pesticide solutions (sometimes called biocides) that act to poison microbes through a chemical mode of action that causes mutations to the DNA, interference with cell metabolism, denaturing and oxidation of proteins, rupturing of the cell wall, and eventual cell lysis. Commodity chemicals like chlorine, hypochlorites, sodium bromide, aldehydes, and many other specialty chemicals like active halogen compounds, quaternary ammonium compounds, phenol-based compounds, organic acids and salts, organosulfur compounds, organometallic compounds, and inorganic compounds are used and can be highly active, but create a variety of toxicity problems for people and the environment, even in infinitesimal dosages of a few parts per million. Intrinsic in the use of chemical antimicrobial pesticides, or biocides, microbes are exposed, at some point, to a non-lethal dose of the chemical. This allows the microbe the opportunity to mutate, and adapt. Adaptive, resistant organisms are sometimes called "superbugs" and are a significant threat to human health. Also in people, chronic human health effects from exposure to such antimicrobial pesticide chemicals include: cancer and other tumors; brain and nervous system damage; birth defects; infertility and other reproductive problems; and damage to the liver, kidneys, lungs, and other body organs. Chronic effects may not appear for weeks, months, or even years after exposure, making it difficult to link health impacts to antimicrobial pesticides, or biocides. Antimicrobial pesticides are found as common contaminants in soil, air, water, and on non-target organisms in our urban landscapes. Once there, they can harm and can be highly toxic to the ecosystem from beneficial soil microorganisms and insects to fish and aquatic invertebrates, and other wildlife.

Non-chemical means of eliminating microbes such as intense UV-C light and heat/steam sterilization are known, but have limited application due to cost, equipment required, and inherent dangers of each.

Filtration is another non-chemical means of removing microbes from water or air, and it is accomplished with nonwoven material, microporous membranes, or other particle filter media such as activated carbon. However, the filter media used requires an enclosed system and a pressure differential to overcome the surface tension of water. This application has limitations because the filter media has to be part of a system of filtration which uses a pressure differential that forces fluid or air through the filter media to successfully trap microorganisms.

Filtration has been done with particles containing antimicrobial chemistry added to the filter media for removal of microorganisms. The antimicrobial chemistry includes using nanomaterials having powerful adsorption capacities because of properties like small size and large surface area. Microorganisms, i.e. bacteria or virus, have been reported to be effectively eliminated by various kinds of organic and inorganic nanomaterials. However, this action is not solely physical removal. A large amount of widely studied inorganic nanomaterials used for water disinfection to remove bacteria include $ZnO$, $Ag$, $TiO_2$, $Cu$, and $Fe_3O_4$ nanoparticles that operate by generating radical oxygen species or metal ions to kill the microorganisms.

Nanoparticles designed to cling to the surface of fabrics can be used as a means of killing or removing germs. The nanoparticles cling to the surface of the fabrics because the particles and the fabric have opposite electrostatic charges. The particles give off metal ions that are poisonous to microbes. In this case, the particles may or may not be porous. The true mode of action against microbes is not physical, but rather is one of chemical interaction with metal ions.

Small particles have been used as absorbent material in applications like accidental spill clean-up and cat litter. These absorbent particles are composed of a multitude of components, and they commonly include synthetic superabsorbent polymers, sawdust, activated carbon, chemicals, and pesticides to combat microbial contamination and odor. These materials are not safe for use on food contacting surfaces, and do not rely on a physical mode of action alone, and the structure of the particles are not pre-hydrated, nor are they specifically designed for trapping and sequestering specific contaminants.

Small particles have also been used for over 100 years in powdered cleanser products for cleaning surfaces. Products that utilize minerals like calcium carbonate, Feldspar powder, sodium carbonate, sodium bicarbonate, alkylbenzene sulfonates, and others. These small particle powders have no specific structure, function, or application in trapping microorganisms, are not prehydrated, and they combine a chemical and physical means of cleaning a surface.

One more recent alternative to chemical disinfection is the use of specialty microfiber for the physical removal of up to 99.99% of microbes with just water alone. The basic concept is that microfiber yarn and its microscopic fibers, that are 1/200 the width of a human hair, can pull water into the fibrous network and trap microbes there. The microbes can then be rinsed away during laundering, or in many cases the microfiber with microbes trapped therein are disposed of. This solution creates an environmental issue of waste, since these microfibers are made of polymers like polyethylene terephthalate (PET) or polypropylene (PP) and do not readily biodegrade. Micro-plastic debris is a growing environmental concern, and the production of synthetic microfiber material has never been higher. Every year, 8 million metric tons of plastics enter our ocean, on top of the estimated 150 million metric tons that currently circulate our marine environments.

SUMMARY OF THE INVENTION

The present disclosure seeks to provide a solution to these problems by providing an improved, non-chemical, mechanical trap for physisorption of contaminants, including but not limited to microbes, into a prehydrated microstructure that acts like a cage or a trap in the form of small particles, which rapidly draw contaminants into microporous, mesoporous, and macroporous voids, cells, or pores. The prehydrated microparticles (PMPs) pull contaminants, including microbes, into a physical trap where they can be rinsed, wiped, flushed, laundered, or otherwise removed with zero chemical pollutants. Because this mechanism of action does not rely on killing the microbe, there is no chemical oxidation, denaturing of proteins, mutation of DNA, or lipid membrane disruption, in this case, there is not a lethal dose. These PMPs will not promote the development and adaptation of resistant "superbugs". The PMPs used can be materials that are Generally Recognized as Safe (GRAS) for direct food contact and contain no synthetic plastic materials. In addition to removing greater than 99% of microbes, including bacteria and viruses, the prehydrated microparticles remove dead cell debris, organic matter, dirt, filth, and grime, which are food sources for live microorganisms. Although the PMPs are effective on their own at trapping and removing contaminants, the prehydrated microstructural trap of PMPs can be used in conjunction with, and be complementary to, common chemical antimicrobials such as, but not limited to, bleach and quaternary ammonium compounds (quats).

In some non-limiting embodiments or aspects of the present disclosure, a method of trapping and removing contaminants from a source of contamination using a microparticle media includes the steps of: providing the microparticle media, wherein the microparticle media includes a plurality of microparticles, and wherein each of the microparticles includes a substrate having pores; prehydrating the pores of the microparticles by mixing the microparticle media with at least one of a water or water of a electrolysis supernatant solution to form a prehydrated microparticle media having a portion of the water or water of the electrolysis supernatant solution absorbed or adsorbed in the pores of the microparticles; introducing the prehydrated microparticle media to the contaminants, wherein the prehydrated microparticle media trap or bind to the contaminants; and separating the prehydrated microparticle media and the contaminants trapped or bound to the prehydrated microparticle media from the source of contamination.

One or more of the following features can be included in the non-limiting embodiments or aspects of the method of trapping and removing contaminants from a source of contamination using the microparticle media.

The prehydrated microparticle media can trap or bind to the contaminants by the pores of the microparticles absorbing the contaminants, the substrate of the microparticles adsorbing the contaminants, the water or water of the electrolysis supernatant solution in the pores of the microparticles bonding to or dissolving the contaminants, or combinations thereof.

The microparticles of the microparticle media can include siliceous compounds including silica or silicates, porous carbons, metal organic framework compounds, calcites, diatomaceous earth or diatomites, zeolites or aluminosilicate minerals, clays, montmorillonite intermixes, halloysites, cellulosic materials, or combinations thereof.

The water of the electrolysis supernatant absorbed or adsorbed in the pores of the microparticles can have a hydrogen to oxygen ratio ranging from 4:1 to about 18:1.

The substrate of the microparticles of the microparticle media can be treated with a surface treatment of hydrophobic functional groups, hydrophilic functional groups, corona discharge treatment, or combinations thereof.

The contaminants can be microorganisms selected from the group consisting of neutrophiles, acidophiles, or alkaliphiles, and the pH of the water of the electrolysis supernatant absorbed or adsorbed in the pores of the microparticles can be buffered to match the pH of the surviving conditions of the microorganisms or can be buffered to oppose the pH of the surviving conditions of the microorganisms.

The step of introducing the prehydrated microparticle media to the contaminants can include applying the prehydrated microparticle media to, mixing the prehydrated microparticle media with, spraying the prehydrated microparticle media, or combinations thereof, on a surface or bulk solution that includes the source of contamination.

The microparticle media can include non-woven fabric, wherein the microparticles can be bound to the non-woven fabric.

The step of introducing the prehydrated microparticle media to the contaminants can include contacting the non-woven fabric, having the microparticles bound to the non-woven fabric, to a surface that includes the source of contamination, and the step of separating the prehydrated microparticle media and the contaminants trapped or bound to the prehydrated microparticle media from the source of contamination can include wiping away the non-woven fabric from the surface that includes the source of contamination.

The geometric structure of the microparticles can be a sphere, disc, cylinder or rod, cone, cube, prism, polyhedron, irregular structure, or combinations thereof.

The microparticles can have a particle size ranging from 0.01 micron to 500 micron.

The geometric structure of the pores of the microparticles can be a sphere, disc, cylinder or rod, cone, cube, prism, polyhedron, irregular structure, or combinations thereof.

The pores of the microparticles can have a pore size ranging from 0.001 micron to 500 micron.

The contaminants can be microorganisms, viruses, organic or inorganic matter, or combinations thereof.

In some non-limiting embodiments or aspects of the present disclosure, a prehydrated microparticle media for trapping and removing contaminants from a source of contamination includes a plurality of microparticles, wherein each of the microparticles includes a substrate having pores, and at least one of a water or water of a electrolysis supernatant solution absorbed or adsorbed in the pores of the microparticles.

One or more of the following features can be included in the non-limiting embodiments or aspects of the prehydrated microparticle media for trapping and removing contaminants from a source of contamination.

The prehydrated microparticle media can trap or bind to the contaminants by the pores of the microparticles absorbing the contaminants, the substrate of the microparticles adsorbing the contaminants, the water or water of the electrolysis supernatant solution in the pores of the microparticles bonding to or dissolving the contaminants, or combinations thereof.

The microparticles of the prehydrated microparticle media can include siliceous compounds including silica or silicates, porous carbons, metal organic framework compounds, calcites, diatomaceous earth or diatomites, zeolites or aluminosilicate minerals, clays, montmorillonite intermixes, halloysites, cellulosic materials, or combinations thereof.

The water or water of the electrolysis supernatant solution absorbed or adsorbed in the pores of the microparticles can have a hydrogen to oxygen ratio ranging from 4:1 to about 18:1.

The substrate of the microparticles of the microparticle media can be treated with a surface treatment of hydrophobic functional groups, hydrophilic functional groups, corona discharge treatment, or combinations thereof.

The microparticle media can include non-woven fabric, wherein the microparticles can be bound to the non-woven fabric.

Figure 1:
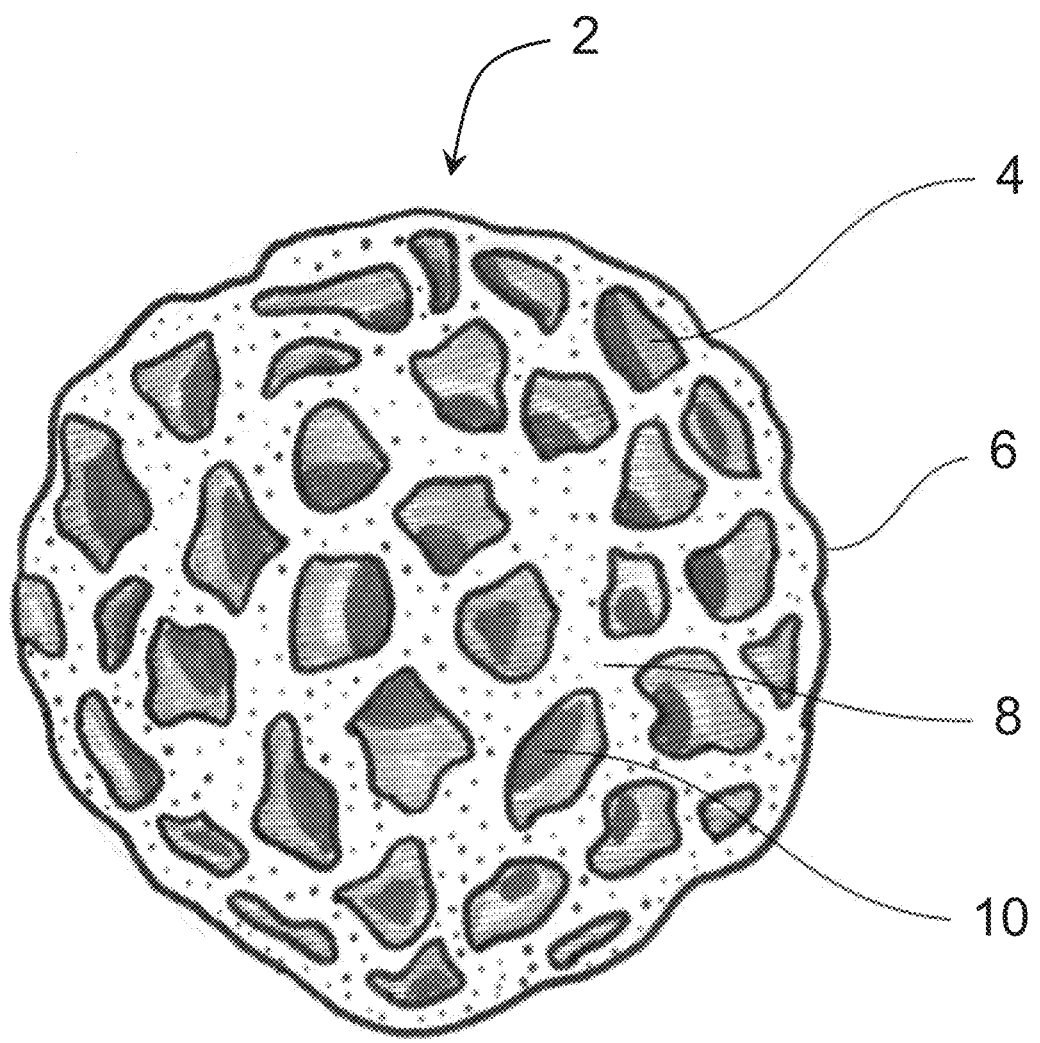
FIG. 1 is a front view of a microparticle of the prehydrated microparticle media, according to some non-limiting embodiments or aspects of the present disclosure.

The exemplifications set out herein illustrate exemplary aspects of the disclosure, and such exemplifications are not to be construed as limiting the scope of the disclosure in any manner.

DESCRIPTION OF THE INVENTION

For purposes of the description hereinafter, spatial orientation terms shall relate to the embodiment as it is oriented in the drawing figures. However, it is to be understood that the various embodiments of this disclosure may assume alternative variations and step sequences, except where expressly specified to the contrary. It is also to be understood that the specific embodiments and processes illustrated in the attached drawings, and described in the following specification, are simply exemplary. Hence, specific dimensions and other physical characteristics related to the embodiments disclosed herein are not to be considered as limiting.

As used in the specification, the singular form of "a", "an", and "the" include plural referents unless the context clearly dictates otherwise.

As used in the claims or the specification, the language "at least one of X or Y" or "at least one of: X; or Y" means "only at least one of X, only at least one of Y, or at least one of X and at least one of Y."

As used in the claims or the specification, the language "at least one of X, Y, or Z" or "at least one of: X; Y; or Z" means "only at least one of X, only at least one of Y, or only at least one of Z; at least one of X and at least one of Y, at least one of X and at least one of Z, or at least one of Y and at least one of Z; or at least one of X and at least one of Y and at least one of Z."

All documents, such as but not limited to issued patents and patent applications, referred to herein, and unless otherwise indicated, are to be considered to be "incorporated by reference" in their entirety.

Referring to FIG. 1, a prehydrated microparticle media for trapping and removing contaminants from a source of contamination, according to one aspect of the present disclosure, includes a plurality of microparticles 2, wherein each of the microparticles 2 includes a substrate 6 having pores 4, 8, and at least one of a water 10 or water of a electrolysis supernatant solution 10 absorbed or adsorbed in the pores 4, 8 of the microparticles 2. Hereinafter, the terms microparticles, prehydrated microparticles, and PMPs will be used interchangeably to refer to the microparticles 2, except when context dictates otherwise such as when referring to dry (not prehydrated) microparticles.

According to one aspect of the prehydrated microparticle media as shown in FIG. 1, the substrate 6 can be a microparticle cage structure, and the average particle size can be, for example, 8 micron. The pores 4 can be, for example, macroporous voids/cells, and the average pore size of the pores can be, for example, 1 micron. The pores 8 can be, for example, mesoporous and/or microporous voids/cells, and the average pore size of the pores 8 can be, for example, greater than 100 nanometers. The water 10 or water of a electrolysis supernatant solution 10 absorbed or adsorbed in the pores 4, 8 of the microparticles 2 can cause the microparticles 2 to be prehydrated at various degrees of % hydration, as measured by wet-weight pickup percent calculation, which is described below. For example, PMPs 2 can be 65% prehydrated.

Natural or man-made microparticles 2, which according to the present disclosure can be formed into PMPs 2, and may or may not be augmented with surface treatments, or water 10 with altered hydrogen to oxygen ratios. These PMPs 2 draw contaminants into micron and sub-micron sized pores 4, 8 or voids. This prehydrated, or wetted microstructure pulls contaminants, including microorganisms, dead or alive, into a physical trap. Many microparticles 2 may also work in conjunction to entrap and agglomerate contaminants and microbes. PMPs 2 are exposed to contaminants when mixed, sprayed, agitated, ground, buffed, purged, or pumped for a period of time. Microparticles 2 can be rinsed, flushed, laundered, wiped, or otherwise removed (i.e. by separation). The microparticles 2, carrying the entrapped microorganisms, can be removed from common environmental surfaces such as metal, glass, plastic, composite, porcelain, natural stone, and other natural materials.

The microparticles 2 can be used on surfaces, machinery and equipment, conveyors, piping, containers, storage tanks, floors, walls, other environmental surfaces, and bulk solutions, without the use of chemical denaturing, oxidizing, or poisoning. By mechanically entrapping the contaminants, and not relying on a chemical mechanism, the adverse effects associated with microbial adaptation and resistance, to so called resistant "superbugs", are reduced or eliminated.

These prehydrated microparticles 2, which can be non-toxic and generally regarded as safe for direct food contact, give the ability to clean and remove germs with a physical mechanism and without using chemical pollutants and plastic. These PMPs 2 can be used alone utilizing only atmospheric moisture (a "dry" method), or with added water that is an additional component from the water 10 or water of the electrolysis supernatant solution 10 absorbed or adsorbed in the pores 4, 8 of the microparticles 2, or in conjunction with cleaning and sanitizing products. For example, the microparticles 2 can be formulated into liquid cleaning formulas, or the microparticles 2 can be applied as an additive and surface treatment to natural or synthetic wipe materials to be used with water alone or with cleaning and disinfection solutions. When applied to a surface, wipe and scrubbing action removes greater than 99% of bacteria, viruses, and food sources for live germs. The powerful entrapment and removal action of the PMPs 2 provides chemical free decontamination of substrates and bulk solutions. Use of the microparticles 2 is safe on glass, metal, wood, laminate, tile, vinyl, and other materials/surfaces. These microparticles 2 also effectively remove dirt, debris, and organic matter that can become a food source for future microbes.

These microparticles 2 can be natural or man-made. The particle size of the microparticles 2 can be 0.01 micron-500 micron or combinations of varieties of sizes. The shape of the microparticles 2 can be: sphere, disc, cylinder or rod, cone, cube, prism, polyhedron, irregular, or combinations of varieties of shapes, or shapes formed by nanofibrous materials or aerogel. The pore size of the pores 4, 8 of the microparticles 2 can be 0.001 micron-500 micron or combinations of varieties of sizes. The shape of the pores can be: sphere, disc, cylinder or rod, cone, cube, prism, polyhedron, natural, or irregular, or combinations of varieties of shapes and sizes, or shapes formed by the pores 4, 8 or voids in nanofibrous material or aerogel. The dispersion of the pores 4, 8 or voids may have a repeating or fractal pattern or be random. Regarding safety, the microparticles 2 can be Generally Recognized as Safe (GRAS) for food contact surfaces.

Prehydration can be achieved through a variety of methods, such as mixing microparticles 2 and water 10 or water of the electrolysis supernatant solution 10 in ribbon blender, a v-blender, a tumble blender, and commercially available blending equipment similar to Littleford blenders. Mixing can be attained through any commercially viable method of mixing powders and liquids. These blenders can be modified with internal spray nozzles to introduce the water while aggressively mixing to create a homogenous blend of hydrated microparticles 2. Lab samples of the prehydrated microparticles 2 used in the microbiology studies described below were prepared using a common kitchen blender and slowly adding the water 10 or water of the electrolysis supernatant solution 10 while mixing. Moisture content was calculated by weighing the bulk microparticles 2 pre and post hydration, to verify a particular % hydration. This method is commonly called wet-weight pickup. The wet-weight pickup percent calculation is:

Weight of Prehydrated Microparticles—PMP
Weight of Dry Microparticles—DMP ((PMP−DMP)/PMP)*100.

The resulting prehydrated microparticles 2 used in the microbiology studies described below were 65% hydrated.

Most bacteria are neutrophiles, meaning they survive in the presence of water at a pH within one or two pH units of the neutral pH of 7. There are microorganisms that survive at pH less than 5.55 are called acidophiles. And, at the other end of the spectrum are alkaliphiles, microorganisms that survive at pH between 8.0 and 10.5.

The pH of water 10 can be adjusted by capturing the supernatant of electrolysis, altering the Hydrogen to Oxygen ratio in water, which leave no additional chemicals or catalysts in the water solution 10. Ratios of Hydrogen to Oxygen of about 4:1, and up to about 18:1 or greater have been described. Altering the ration of hydrogen and oxygen in water, with this method, effects the pH, but does not introduce other chemicals that normally alter pH, like common hydrochloric acid or sodium hydroxide. The pH of the water of the electrolysis supernatant 10 absorbed or adsorbed in the pores of the microparticles can range from less than 1 to 14.

In one embodiment, the Hydrogen to Oxygen ratio of the water 10 used to prehydrate the particles can be accomplished by ambient or room temperature water electrolysis and can be performed under acidic or alkaline conditions. The water electrolysis can be performed in an electrolyser with a proton exchange membrane, which is called PEM water electrolysis. The resulting liquid can be used in pure form or diluted in purified water to achieve the desired pH.

In one embodiment, by using electrolysis supernatant water 10 where the oxygen to hydrogen ratio has been altered, it can be possible to create prehydrated microparticles 2 that are buffered or tuned to match the pH of the microbial contaminant, so that the microbes affinity for the PMP 2 matrix is improved, and physisorption is more thorough and complete, and the microbes survive, but are trapped and sequestered.

In one embodiment, by using electrolysis supernatant water 10 where the oxygen to hydrogen ratio has been altered, it can be possible to create prehydrated microparticles 2 that are buffered or tuned to the pH opposite of the microbial contaminant, so that the prehydrated microparticles 2 act as an antagonist matrix to trap and eliminate microbes by creating an environment in which the microbes cannot survive.

Samples of prehydrated microparticles 2 were prepared with water 10 that had different Hydrogen to Oxygen ratios. Some samples favored oxygen, and the others favored hydrogen.

In one embodiment, by using electrolysis supernatant water 10 where the oxygen to hydrogen ratio has been altered, it can be possible to create prehydrated microparticles 2 that are buffered or tuned to the pH opposite of the organic or inorganic contaminant, so that the prehydrated microparticles 2 act as an antagonist matrix to trap and eliminate contaminants by creating an environment which traps and neutralizes the contaminant.

In one embodiment the PMPs 2 could have a surface treatment. The optional surface treatment utilizes hydrophilic and/or hydrophobic chemistry. Organic molecules and/or organic-inorganic hybrid molecules may be used as a surface treatment to the microparticles 2. The organic molecules and/or organic-inorganic hybrid molecules may include hydrophobic functional groups or hydrophilic functional groups, or combinations thereof. The hydrophobic functional groups or hydrophilic functional groups, or combinations thereof may aid in driving capillary action of the wettable microstructure of the microparticles 2 to draw in water and physically trap contaminants.

In one embodiment, the PMPs 2 may be plasma or Corona treated. Corona discharge treatment can be used to increase the hydrophilicity of a surface. Corona discharge treatment may be used on the microparticles 2 to increase the capillary action of the wettable microstructure to draw in water and physically trap contaminants.

Examples of man-made or synthetic forms of these porous microparticles 2 include, but are not limited to, siliceous materials such as micro, meso, and/or macroporous Silica, porous Carbons. and Metal Organic Framework Structures (MOFS). Examples of natural forms of these microparticles 2 include, but are not limited to, porous rock such as Calcite, Diatomaceous Earth or Diatomite, Zeolites (aluminosilicate minerals), Clays, Montmorillonite intermixes, Halloysite, and cellulosic materials.

Examples of application methods include but are not limited to the following methods. These PMPs 2 which act as a trap for the removal of contaminants can be applied to surfaces, substrates, and bulk solutions by dispensing from a container, drum, bag, or canister. PMPs 2 can then be introduced or exposed to the substrate or bulk solutions, by being sprayed, pumped, mixed, agitated, ground, buffed, or purged, for a period of time. Then the PMPs 2 can be rinsed, flushed, laundered, wiped, or otherwise removed (i.e. by separation), with no antimicrobial pesticide chemicals and no plastic pollutants. PMPs 2 can be used in indoor and outdoor applications to sequester unwanted contaminants in industrial, commercial, and household environments, can be compatible with metal, glass, plastic, composite, porcelain, natural stone, other natural materials, and can be used on surfaces, machinery and equipment, conveyors, piping, containers, storage tanks, floors, walls, and other environmental surfaces.

In one embodiment the PMPs 2 can be formulated into liquid solutions, where they can be sprayed, wiped, pumped, mixed, agitated, ground, buffed, or purged, for a period of time. Another alternative is to apply the microparticles 2 to rolled goods in the manufacturing process, such as nonwoven wiper material or fabric, for example paper towels. These rolled goods, containing the microparticles 2 can then be used with water or cleaning and disinfection formulas that are additional components from the water 10 or water of the electrolysis supernatant solution 10 absorbed or adsorbed in the pores 4, 8 of the microparticles 2. Once applied to a surface via any of the above methods, the effectiveness of the microparticles 2 can depend upon the performance of the user. The rubbing and wiping action onto the surface can be performed with water or other solutions that are additional components from the water 10 or water of the electrolysis supernatant solution 10 absorbed or adsorbed in the pores 4, 8 of the microparticles 2, or it can be done without additional water or solution which relies on atmospheric moisture present on environmental surfaces. This wiping and rubbing action drives the mechanical and physical interaction of the microparticles 2 with the microbes and contaminants (dirt, filth, and residue). The wiping and rubbing action combined with the size, shape, and dispersion of the PMPs 2 and the size, shape, and dispersion of the voids or pores 4, 8 of the PMPs 2, results in the physisorption of the contaminants, microbes, organic and inorganic material, into and onto the PMPs 2.

The PMPs 2 can trap and remove contaminants through the pores 4, 8 of the microparticles 2 absorbing the contaminants, the substrate 6 of the microparticles 2 adsorbing the contaminants, the water 10 or water of the electrolysis supernatant solution 10 in the pores 4, 8 of the microparticles 2 bonding to or dissolving the contaminants, or combinations thereof.

Figure 2:
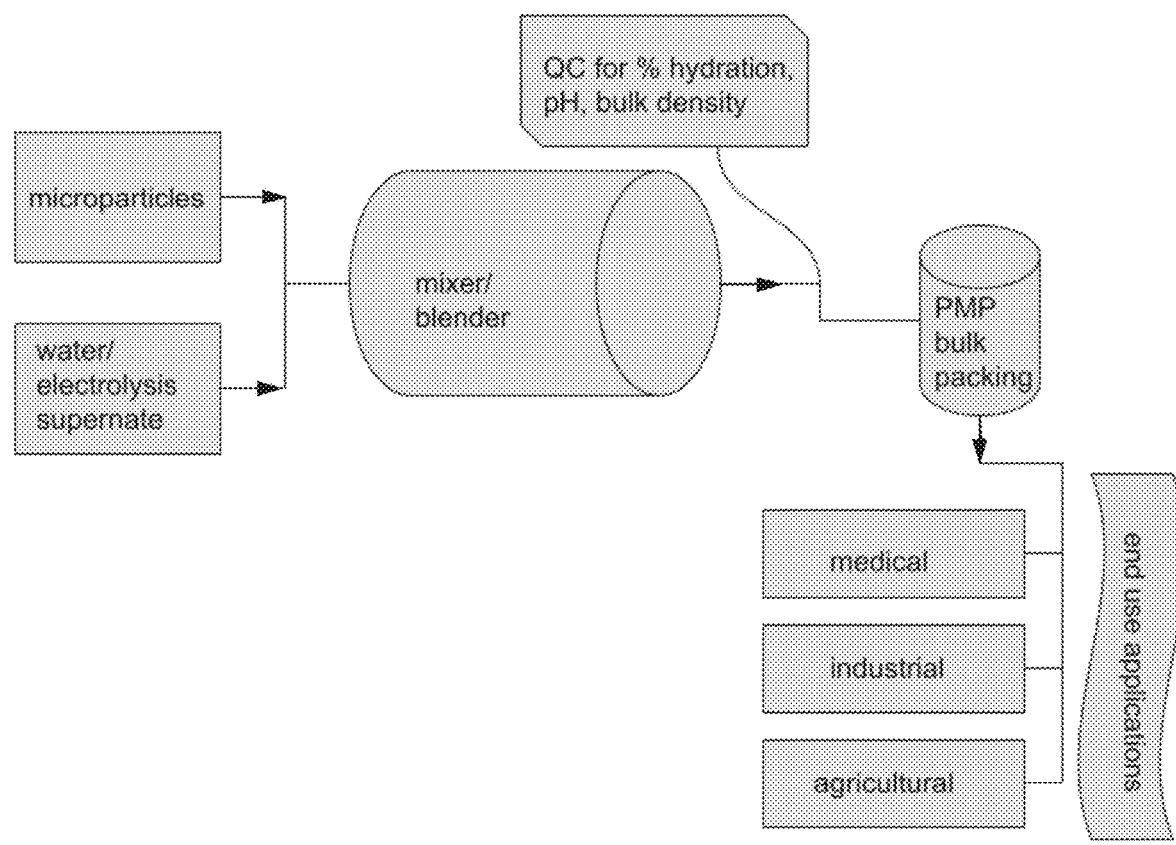
FIG. 2 is a process flow chart for creating prehydrated microparticles (PMPs) and end use applications of the PMPs, according to some non-limiting embodiments or aspects of the present disclosure.

Referring to FIG. 2, there is shown a process flow chart for creating prehydrated microparticles 2 and there is shown the end use applications of the PMPs 2, according to some non-limiting embodiments or aspects of the present disclosure. As shown in FIG. 2, microparticles 2 and water 10 or water of the electrolysis supernatant solution 10 are provided in a mixer/blender, and the microparticles 2 are prehydrated by mixing the microparticles 2 with at least one of a water 10 or water of the electrolysis supernatant solution 10 to form a prehydrated microparticle media, which has a portion of the water 10 or water of the electrolysis supernatant solution 10 absorbed or adsorbed in the pores 4, 8 of the microparticles 2. After the microparticles 2 are prehydrated, they can tested under standard quality control processes to measure, for example, % hydration, pH levels, and/or bulk density. The PMPs 2 can then be subjected to bulk packing before their end use applications. The PMPs 2 can have various medical, industrial, and agricultural end use applications, as are described herein.

In one embodiment the PMPs 2 could be utilized in agriculture. Contaminants including microbes such as bacterial and fungal species create problems for growing crops. Fungi take their energy from the plants on which they live. They are responsible for a great deal of damage and are characterized by wilting, scabs, moldy coatings, rusts, blotches and rotted tissue. The PMPs 2 could be used alone or in combination with other liquids or powders by dusting, spraying from solution, or mixing with growth media or soil to trap and sequester the unwanted contaminants.

In one embodiment the PMPs 2 could be utilized in cosmetic and medical applications on skin. Bacteria cause cellulitis, impetigo, and staphylococcal (staph) infections. Viruses cause shingles, warts, and herpes simplex. Fungi cause athlete's foot and yeast infections. PMPs could be used alone or part of a liquid, paste, salve, or ointment, to trap and sequester the unwanted contaminants.

In one embodiment the PMPs 2 could be utilized in oil and gas applications. During hydraulic fracturing (fracking) to recover oil or natural gas from the earth, water and proppant make up about 99 percent of the materials used in fracking fluid. Sand helps keep the crevices and cracks open, allowing water and gas to flow from the rock seams. In the process, sulfate reducing bacteria (called SRBs), which use sulfate ions in the water for energy, create hydrogen sulfide, a toxic molecule that "sours" the gas product. The bacteria also clog the cracks or fissures and prevent the oil or gas from flowing. To combat this process, standard practices include using toxic biocides like formaldehyde and glutaraldehyde in an attempt to preserve a usable gas or oil product, and keep it flowing. The PMPs 2 could be used alone or in combination with other liquids or powders during the process of fracking by mixing with proppant solutions or produced water to trap and sequester unwanted contaminants including sulfate reducing bacteria.

In one embodiment the PMPs 2 could be utilized in the agricultural production and processing of protein such as beef, poultry, and pork. Contamination of food by microbes is a public health concern around the world. Episodes of food poisoning due to microbial contamination have led to a large number of food recalls, particularly of meat products that have caused outbreaks of dangerous illnesses. The most common pathogenic bacteria found in beef is *Escherichia* coli. In pork, *E. coli*, *Salmonella*, *S. aureus*, and *Yersinia enterocolitica* are the most common bacterial contaminants. Chicken is often contaminated with *Salmonella enteritidis*. *S. aureus*, *Campylobacter jejuni*, *L. monocytogenes*, and *E. coli*. PMPs 2 could be used alone or part of a liquid, paste, or dusted powder, to trap and sequester the unwanted contaminants including microbes of concern on the protein itself and on the environmental surfaces in food processing manufacturing plants.

EXAMPLE

A microbiology study was performed to demonstrate the effectiveness of PMPs 2 for trapping and removing contaminants from a source of contamination. In this study, amorphous silicon dioxide was used as the substrate 6 of the microparticle 2 with the following specifications:

| Whiteness (%) | 95 min |
|---|---|
| Pore Volume (ml/g) | 1.25 |
| BET Surface Area ($m^2/g$) | 300 |
| Total Volatile (% water) | 65% |
| Oil Absorption (ml/100g) | 200 |
| Loose bulk density dry (mL/5 g) | 45 |
| Average Particle Size (micron) | 8.5 |

Although the PMPs 2 can be produced by several different materials and processes, these PMPs 2 were manufactured using a method called the sol-gel process. Monomers polymerize to generate primary silica particles, referred to as silica sol. These particles then come together to form a three-dimensional structure. The conditions in which these particles are grown affect, and are used to control, particle size, surface area, pore diameter, and pore volume. These physical properties can be tweaked by adjusting production conditions, making it possible to optimize this grade of microporous silica. With small viruses being about 10-20 nanometers, and larger bacteria being about 1-3 microns, the microporous structure can be specifically selected for the trapping and removal of a variety of microbes.

The following exemplary microorganisms/virus were chosen, two bacteria (Gram-positive, Gram-negative) and a virus, in the microbiology study performed to demonstrate the effectiveness of PMPs 2 for trapping and removing contaminants from a source of contamination.

*Staphylococcus aureus* 6538

This bacterium is a Gram-positive, spherical-shaped, facultative anaerobe. *Staphylococcus* species are known to demonstrate resistance to antibiotics such as methicillin. *S. aureus* pathogenicity can range from commensal skin colonization to more severe diseases such as pneumonia and toxic shock syndrome (TSS). *S. aureus* is commonly used in several test methods as a model for gram positive bacteria. It can be difficult to disinfect but does demonstrate susceptibility to low level disinfectants.

*Pseudomonas aeruginosa* ATCC 15442

This bacteria is a Gram-negative, rod-shaped microorganism with a single flagellum. It grows optimally under aerobic conditions, however, it can use a host of electron receptors to respire anaerobically. *P. aeruginosa* can be found almost anywhere in nature and it is an opportunistic pathogen. Like many other bacterial-related diseases, the ability to form resilient biofilms within human tissues under anaerobic conditions is thought to be the primary cause for pathogenicity.

MS2 Bacteriophage (MS2), ATCC 15597-B1

This virus is a non-enveloped positive-stranded RNA virus of the bacteriophage family Leviviridae/Fiersviridae. Bacterial cells are the hosts for bacteriophages, and *E. coli* 15597 serves this purpose for MS2 bacteriophage. Its small size, icosohedral structure, and environmental resistance has made MS2 ideal for use as a surrogate virus (particularly in place of picornaviruses such as poliovirus and human norovirus) in water quality and disinfectant studies. Permissive Host Cell System for MS2: *Escherichia coli* 15597.

Test Method:

Bacterial/Viral Removal Study Based on: ASTM E1153

To consider the study to be scientifically defensible, the following criteria were met:
1. The initial and final concentration of microorganisms must be significantly high enough to observe significant log/percent reduction.
2. The media used for testing must be sterile.
3. The target microorganism must be pure colony morphology.

| Cultures Initiated | Dec. 16, 2020 |
|---|---|
| Carriers Inoculated | Dec. 17, 2020 |
| Carriers Tested | Dec. 17, 2020 |
| Enumeration Plates Evaluated | Dec. 18, 2020 |
| Culture Growth Media: | Tryptic Soy Broth |
| Culture Growth Time: | 18-24 hours |
| Carrier Type: | 1" × 3" Glass Slides |
| Inoculum Volume | 0.030 ml |
| Carrier Dry Time | 15-20 minutes |
| Carrier Dry Temp. and Humidity: | Ambient |
| Contact Time: | 15 seconds |
| Contact Temperature: | Ambient |
| Harvest Media (Volume): | D/E Broth (20.0 ml) |
| Incubation Temperature: | 36 ± 1° C. |
| Enumeration Media: | Nutrient Agar (SA) |
| | Tryptic Soy Agar (PA) |
| Incubation Time: | ~24 hours |

The test microorganisms were prepared, by growth in liquid culture medium. Sterilized carriers were inoculated with a volume of the test culture. Inoculated slides were dried. Only completely dried carriers were used in the test. Test carriers were treated with the test substance and incubated for the predetermined contact time.

Two types of tests were performed:

Test A:
   65% prehydrated microparticles 2 were added to the inoculated carrier for 15 seconds. The test substance was then removed by irrigating the carrier with sterile PBS (phosphate buffered saline) prior to harvesting in extraction media.

Test B:
   Dry (not prehydrated) microparticles were added to the inoculated carrier for 15 seconds. The test substance was then removed by irrigating the carrier with sterile PBS prior to harvesting in extraction media.

The test microorganisms were prepared, by growth in liquid culture medium. Sterilized carriers were inoculated with a volume of the test culture. Inoculated slides were dried. Only completely dried carriers were used in the Control carriers were harvested at appropriate intervals to accurately represent any reduction during the contact time. Numbers control carriers were inoculated and allowed to dry. The control carriers were directly harvested in extraction media (i.e. no irrigation with PBS performed). At the conclusion of the contact time, test and control carriers were chemically neutralized (despite there being no chemicals used in this test, only silica, this is standard practice). Dilutions of the neutralized test substance were evaluated using appropriate growth media to determine the remaining microorganisms at the respective contact time.

The effect of the test substance A and test substance B was compared with carriers exposed to no test substance to determine percent or log reduction of microorganism.

The results of the microbiology study performed to demonstrate the effectiveness of PMPs 2, versus dry (not prehydrated) microparticles, for trapping and removing contaminants from a source of contamination are shown below in Table 1 and the graphical representations displayed in FIG. 3, FIG. 4, and FIG. 5

Results:

TABLE 1

| Test Microorganism | Test Substance | Test Substance Quantity | Remaining CFU's | Percent Reduction | Log Reduction |
|---|---|---|---|---|---|
| Virus (MS2Phage) | Control | n/a | 160,000,000 | — | — |
| | Dry Microparticles | 0.5 grams | 124,000,000 | 22.50% | 0.11 |
| | 65% Prehydrated Microparticles | 0.5 grams | 1,400,000 | 99.13% | 2.06 |
| P. aeruginosa | Control | n/a | 179,000,000 | — | — |
| | Dry Microparticles | 0.5 grams | 11,100,000 | 93.79% | 1.21 |
| | 65% Prehydrated Microparticles | 0.5 grams | 19,000 | 99.99% | 3.97 |
| S. aureus | Control | n/a | 33,000,000 | — | — |
| | Dry Microparticles | 0.5 grams | 8,100,000 | 75.45% | 0.61 |
| | 65% Prehydrated Microparticles | 0.5 grams | 51,000 | 99.85% | 2.81 |

Figure 3:
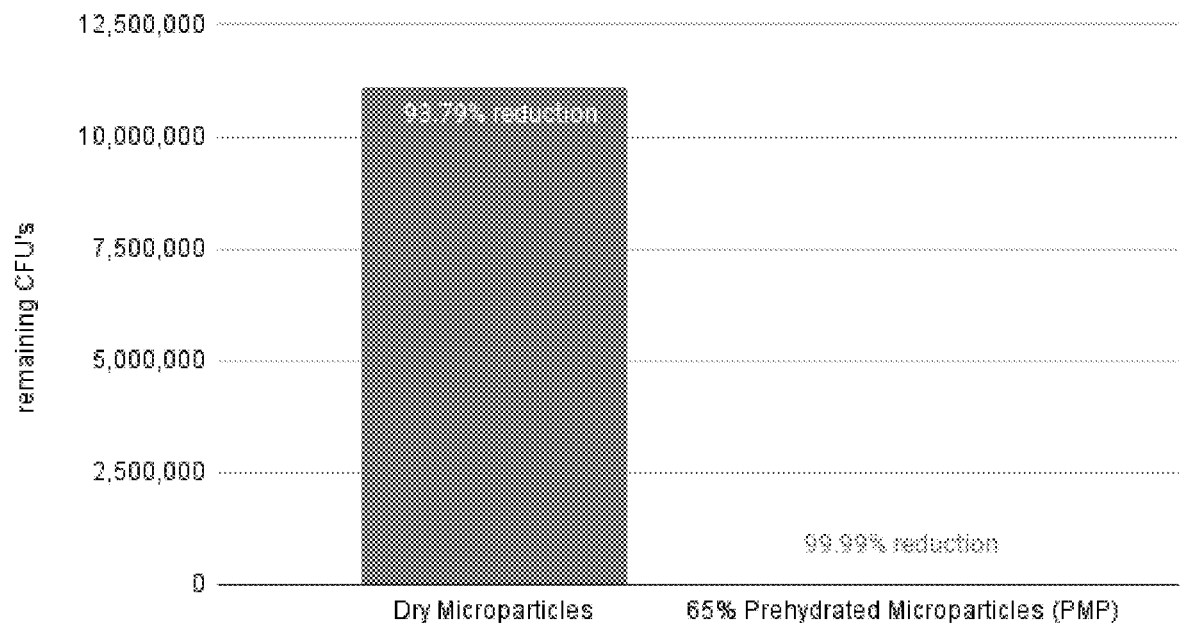
FIG. 3 is a graphical representation of the results of a microbiology study performed to demonstrate the effectiveness of PMPs, versus dry (not prehydrated) microparticles, for trapping and removal of a strain of *Pseudomonas aeruginosa* as an exemplary microorganism.

As shown in Table 1 and as shown FIG. 3, the prehydrated microparticles 2 generated a 99.99% reduction of *Pseudomonas aeruginosa* in the test substance, whereas the dry microparticles generated only a 93.79% reduction of *Pseudomonas aeruginosa* in the test substance.

Figure 4:
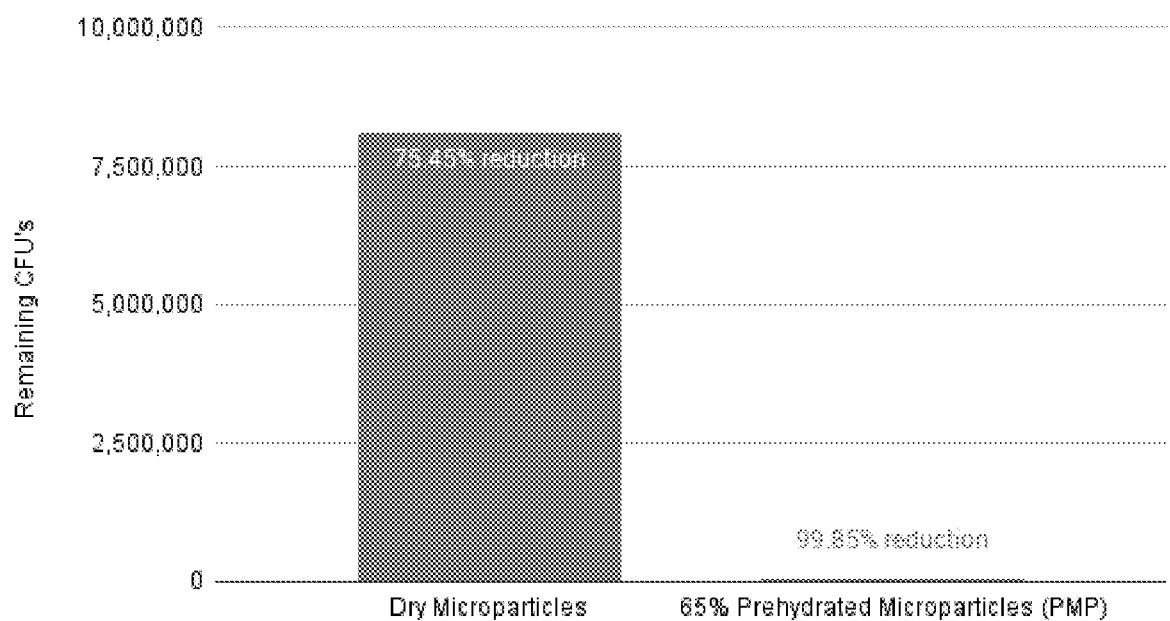
FIG. 4 is a graphical representation of the results of a microbiology study performed to demonstrate the effectiveness of PMPs, versus dry (not prehydrated) microparticles, for trapping and removal of a strain of *Staphylococcus aureus* as an exemplary microorganism.

As shown in Table 1 and as shown in FIG. 4, the prehydrated microparticles 2 generated a 99.85% reduction of *Staphylococcus aureus* in the test substance, whereas the dry microparticles generated only a 75.45% reduction of *Staphylococcus aureus* in the test substance.

Figure 5:
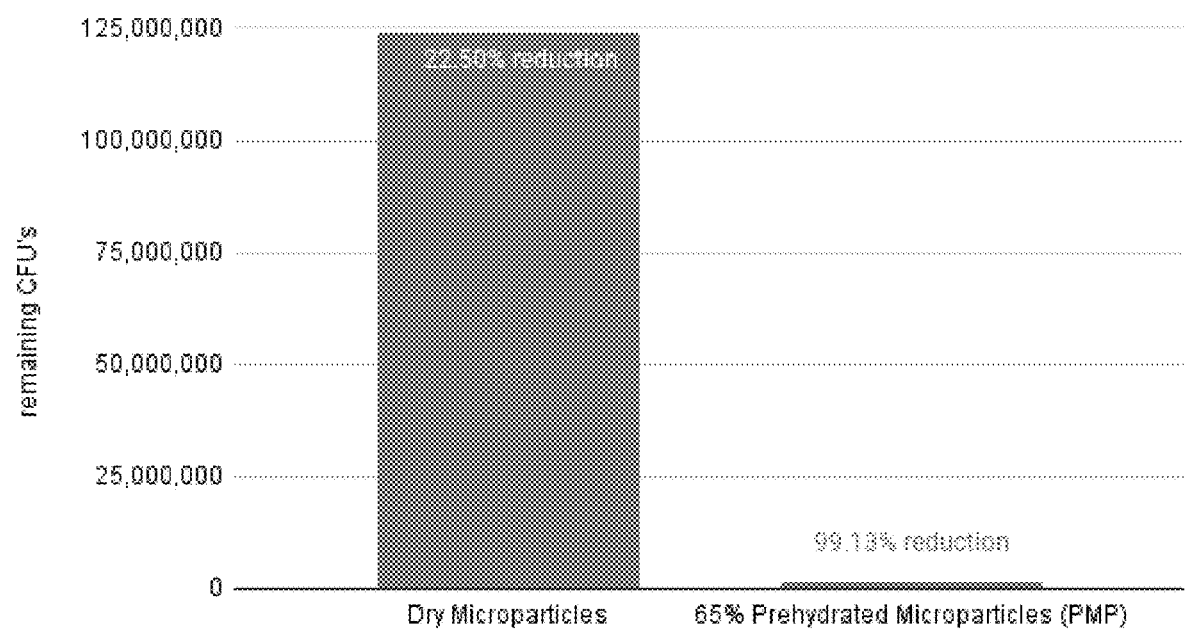
FIG. 5 is a graphical representation of the results of a microbiology study performed to demonstrate the effectiveness of PMPs, versus dry (not prehydrated) microparticles, for trapping and removal of Bacteriophage MS2 virus as an exemplary microorganism/virus.

Finally, as shown Table 1 and as shown in FIG. 5, the prehydrated microparticles 2 generated a 99.13% reduction of MS2 Bacteriophage in the test substance, whereas the dry microparticles generated only a 22.50% reduction of MS2 Bacteriophage in the test substance.

The invention claimed is:

1. A method of trapping and removing contaminants from a source of contamination using a microparticle media comprising the steps of:
providing the microparticle media, wherein the microparticle media comprises a plurality of microparticles, and wherein each of the microparticles comprises a substrate having pores;
prehydrating the pores of the microparticles by mixing the microparticle media with at least one of a water or water of an electrolysis supernatant solution to form a prehydrated microparticle media having a portion of the water or water of the electrolysis supernatant solution absorbed in the pores of the microparticles;
introducing the prehydrated microparticle media to the contaminants, the water or water of the electrolysis supernatant solution present and absorbed in the pores of the microparticles when introducing the prehydrated microparticle media to the contaminants, wherein the prehydrated microparticle media trap or bind to the contaminants; and
separating the prehydrated microparticle media and the contaminants trapped or bound to the prehydrated microparticle media from the source of contamination.

2. The method of trapping and removing contaminants of claim 1, wherein the prehydrated microparticle media trap or bind to the contaminants by at least one of the pores of the microparticles absorbing the contaminants, the substrate of the microparticles adsorbing the contaminants, or the water or water of the electrolysis supernatant solution in the pores of the microparticles bonding to or dissolving the contaminants.

3. The method of trapping and removing contaminants of claim 1, wherein the microparticles of the microparticle media comprise at least one of: siliceous compounds including silica or silicates; porous carbons; metal organic framework compounds; calcites; diatomaceous earth or diatomites; zeolites or aluminosilicate minerals; clays; montmorillonite intermixes; halloysites; or cellulosic materials.

4. The method of trapping and removing contaminants of claim 1, wherein the prehydrating step uses both the water and the water of the electrolysis supernatant solution, the method further comprising:
prehydrating the pores of the microparticles by mixing the microparticle media with the water and the water of the electrolysis supernatant solution to form a prehydrated microparticle media having a portion of the water and a portion of the water of the electrolysis supernatant solution absorbed in the pores of the microparticles, wherein the water of the electrolysis supernatant absorbed in the pores of the microparticles has a hydrogen to oxygen ratio ranging from 4:1 to about 18:1.

5. The method of trapping and removing contaminants of claim 4, wherein the contaminants are microorganisms selected from the group consisting of neutrophiles, acidophiles, or alkaliphiles, and wherein the pH of the water of the electrolysis supernatant absorbed in the pores of the microparticles is buffered to match the pH of the surviving conditions of the microorganisms or buffered to oppose the pH of the surviving conditions of the microorganisms.

6. The method of trapping and removing contaminants of claim 1, wherein the substrate of the microparticles of the microparticle media is treated with a surface treatment of at least one of hydrophobic functional groups, hydrophilic functional groups, or corona discharge treatment.

7. The method of trapping and removing contaminants of claim 1, wherein the step of introducing the prehydrated microparticle media to the contaminants comprises at least one of applying the prehydrated microparticle media to, mixing the prehydrated microparticle media with, or spraying the prehydrated microparticle media on a surface or bulk solution that includes the source of contamination.

8. The method of trapping and removing contaminants of claim 1, wherein the microparticle media further comprises non-woven fabric, wherein the microparticles are bound to the non-woven fabric.

9. The method of trapping and removing contaminants of claim 8,
- wherein the step of introducing the prehydrated microparticle media to the contaminants includes contacting the non-woven fabric, having the microparticles bound to the non-woven fabric, to a surface that includes the source of contamination, and
- wherein the step of separating the prehydrated microparticle media and the contaminants trapped or bound to the prehydrated microparticle media from the source of contamination includes wiping away the non-woven fabric from the surface that includes the source of contamination.

10. The method of trapping and removing contaminants of claim 1, wherein the geometric structure of the microparticles is at least one of a sphere, disc, cylinder or rod, cone, cube, prism, polyhedron, or irregular structure.

11. The method of trapping and removing contaminants of claim 1, wherein the microparticles have a particle size ranging from 0.5 micron to 175 microns.

12. The method of trapping and removing contaminants of claim 1, wherein the geometric structure of the pores of the microparticles is at least one of a sphere, disc, cylinder or rod, cone, cube, prism, polyhedron, or irregular structure.

13. The method of trapping and removing contaminants of claim 1, wherein the pores of the microparticles have a pore size ranging from 0.01 micron to 2 microns.

14. The method of trapping and removing contaminants of claim 1, wherein the contaminants are at least one of microorganisms, viruses, or organic or inorganic matter.

15. A prehydrated microparticle media for trapping and removing contaminants from a source of contamination comprising:
- a plurality of microparticles, wherein each of the microparticles comprises a substrate having pores; and
- at least one of a water or water of an electrolysis supernatant solution absorbed in the pores of the microparticles,
- wherein the water or water of the electrolysis supernatant solution is present and absorbed in the pores of the microparticles when introducing the prehydrated microparticle media to the contaminants.

16. The prehydrated microparticle media of claim 15, wherein the prehydrated microparticle media trap or bind to the contaminants by at least one of the pores of the microparticles absorbing the contaminants, the substrate of the microparticles adsorbing the contaminants, or the water or water of the electrolysis supernatant solution in the pores of the microparticles bonding to or dissolving the contaminants.

17. The prehydrated microparticle media of claim 15, wherein the microparticles of the prehydrated microparticle media comprise at least one of: siliceous compounds including silica or silicates; porous carbons; metal organic framework compounds; calcites; diatomaceous earth or diatomites; zeolites or aluminosilicate minerals; clays; montmorillonite intermixes; halloysites; or cellulosic materials.

18. The prehydrated microparticle media of claim 15, wherein the water or water of the electrolysis supernatant solution absorbed in the pores of the microparticles has a hydrogen to oxygen ratio ranging from 4:1 to about 18:1.

19. The prehydrated microparticle media of claim 18, wherein the substrate of the microparticles of the microparticle media is treated with a surface treatment of at least one of hydrophobic functional groups, hydrophilic functional groups, or corona discharge treatment.

20. The prehydrated microparticle media of claim 15, wherein the microparticle media further comprises non-woven fabric, wherein the microparticles are bound to the non-woven fabric.

\* \* \* \* \*